United States Patent [19]
Belt et al.

[11] Patent Number: 5,985,233
[45] Date of Patent: Nov. 16, 1999

[54] LOW-MELTING POTASSIUM FLUOROALUMINATE

[75] Inventors: Heinz-Joachim Belt, Burgwedel; Ruediger Sander, Sehnde; Werner Rudolph, Hannover, all of Germany

[73] Assignee: Solvay Fluor und Derivate GmbH, Hannover, Germany

[21] Appl. No.: 08/948,396

[22] Filed: Oct. 10, 1997

[30] Foreign Application Priority Data

Oct. 18, 1996 [DE] Germany ............................ 196 43 026

[51] Int. Cl.⁶ ................. C01F 7/54; B23K 35/34
[52] U.S. Cl. ............................. 423/465; 148/26
[58] Field of Search .................... 423/465, 464; 148/26

[56] References Cited

U.S. PATENT DOCUMENTS

| | | | |
|---|---|---|---|
| 4,428,920 | 1/1984 | Willenberg et al. | 423/465 |
| 4,579,605 | 4/1986 | Kawase et al. | 148/26 |
| 4,619,716 | 10/1986 | Suzuki et al. | 148/26 |
| 5,318,764 | 6/1994 | Meshri et al. | 423/465 |

FOREIGN PATENT DOCUMENTS

| | | | |
|---|---|---|---|
| 0597652 | 5/1994 | European Pat. Off. | 423/465 |
| 60-99477 | 6/1985 | Japan | 148/26 |
| 60-204616 | 10/1985 | Japan . | |
| 8-157212 | 6/1996 | Japan | 423/465 |

OTHER PUBLICATIONS

English abstracts (2) for JP 60–204,616, Oct. 1985.

*Primary Examiner*—Ngoc-Yen Nguyen
*Attorney, Agent, or Firm*—Evenson, McKeown, Edwards & Lenahan, P.L.L.C.

[57] ABSTRACT

The production of a potassium fluoroaluminate having a low melting point, which can be used as a flux when soldering aluminum. The potassium fluoroaluminate is prepared in an aqueous medium from aluminum hydroxide, hydrogen fluoride and potassium hydroxide in a molar ratio of aluminum:fluorine:potassium of approximately 1:5:2. After drying at 80° C. under vacuum, the resulting potassium fluoroaluminate has a differential scanning calorimetry melting point of about 548° C.

5 Claims, No Drawings

LOW-MELTING POTASSIUM FLUOROALUMINATE

BACKGROUND OF THE INVENTION

The present invention relates to a method for the preparation of a low-melting potassium fluoroaluminate, to the product obtainable according to the method of the invention, and to the use of the product as a flux for soldering light metal materials.

In hard soldering or oven soldering, metal materials, in particular aluminum, are joined at a temperature above 500° C. with the aid of a molten added metal (solder). A flux is added in order to remove oxides and other disruptive covering films on the metal surface. For this purpose, in particular, fluxes composed of potassium fluoroaluminates are used. The production of potassium fluoroaluminates has been investigated from both a technical and a scientific point of view. According to the publication by I. V. Tananaev and M. A. Nekhamkina in Izvest. Sektora Fiz.-Khim-Anal., Akad. Nauk S.S.S.R. 20, pages 227 to 237 (1950), potassium fluoroaluminates may, for example, be prepared from (highly diluted) solutions of potassium fluoride and aluminum fluoride. At a molar ratio of KF to $AlF_3$ of 2:1 to 10:1, substantially the hydrate of dipotassium pentafluoroaluminate ($K_2AlF_5 \cdot H_2O$) is apparently produced. The melting point of this product according to the Russian publication is 855° C. Although monopotassium tetrafluoroaluminate and tripotassium hexafluoroaluminate exist, they are not produced according to Tananaev et al., at least in the quoted range for the molar ratio of KF to $AlF_3$ of 1:1 to 10:1. A potassium fluoroaluminate having such a high melting point would be unsuitable, for example, as a soldering flux for soldering aluminum.

Willenberg et al., U.S. Pat. No. 4,428,920, discloses a method for the preparation of potassium tetrafluoroaluminate having a melting point below 575° C. In this method, fluoroaluminium acid is reacted with potassium hydroxide. It is noted that no satisfactory product is obtained when using equimolar quantities of the reactants, and it is therefore proposed to introduce a less than stoichiometric amount of potassium into the reaction mixture. The lowest melting point of the products prepared is 570° C.

According to Shimizu et al, U.S. Pat. No. 5,171,377, a melting point of 560° C., as observed in potassium fluoroaluminates, is still regarded as being too high. The lowering of the melting point, as is achieved by admixing aluminum ammonium fluoride or by using mixtures of caesium fluoroaluminate and aluminum fluoride, is regarded as having drawbacks.

Kawase, U.S. Pat. No. 4,579,605, discloses a flux for soldering aluminum which comprises a mixture of monopotassium tetrafluoroaluminate and dipotassium pentafluoroaluminate or the hydrate thereof. Such mixtures are said to melt at a temperature of 555° C. to 574° C. They are produced, if reaction mixtures are produced in which, as an indispensable prerequisite, the ratio of Al:F:K lies in the range from 1:4 to 4.5:1 to 1.5.

SUMMARY OF THE INVENTION

It is an object of the present invention to provide a potassium fluoroaluminate which has an even lower melting point than the heretofore known potassium fluoroaluminates.

This and other objects have been achieved in accordance with the present invention by providing a potassium fluoroaluminate produced by the method comprising reacting $Al(OH)_3$, HF and KOH in aqueous medium in a molar ratio of AL:F:K=1:5±0.2:2±0.1, and recovering precipitated potassium fluoroaluminate, wherein the potassium fluoroaluminate has a melting point of 546 to 550° C. measured by differential scanning calorimetry after drying under vacuum at 80° C.

In accordance with a further aspect of the invention, the objects are also achieved by providing a method for preparing a potassium fluoroaluminate useful as a flux having a low melting point for soldering aluminum, the method comprising reacting $Al(OH)_3$, HF and KOH in aqueous medium in a molar ratio of Al:F:K=1:5±0.2:2±0.1, and recovering precipitated potassium fluoroaluminate having a melting point of 546 to 550° C., as measured by differential scanning calorimetry after drying under vacuum at 80° C.

DESCRIPTION OF PREFERRED EMBODIMENTS

The method according to the invention for the preparation of a potassium fluoroaluminate usable as a flux having a low melting point for soldering aluminum is characterized in that $Al(OH)_3$, HF and KOH are reacted in aqueous medium in a molar ratio of Al:F:K=1:5±0.2:2±0.1, and a precipitated low-melting potassium fluoroaluminate is recovered having a melting point of 546 to 550° C. as measured by differential scanning calorimetry after drying under vacuum at 80° C.

Preferably the reactants are used in a molar ratio of Al:F:K=1:5±0.1:2±0.05.

The hydrogen fluoride is advantageously introduced into the reaction in the form of a hydrofluoric acid, in which case the concentration of HF should advantageously be within the range from 20 to 70% by weight. The KOH may then advantageously be introduced into the reaction in solid form or as lye in a concentration of 20 to 60% by weight KOH. The aluminum hydroxide (aluminum oxide hydrate) is advantageously used as a solid.

Advantageously, the reaction is carried out in such a way that an aqueous hydrogen fluoride solution is used as recipient, aluminum hydroxide is added, and then potassium hydroxide is added.

The crystalline product produced by the reaction is separated from the supernatant reaction solution, for example, by filtering. It can then be dried. To this end, it may be dried, for example, in a vacuum, advantageously at a temperature below 100° C., for example at 80° C.

The product obtained in this manner has a melting point in the range from 546 to 550° C. according to DSC. The potassium fluoroaluminate obtained according to the method of the invention with this melting point of 546 to 550° C., preferably 547 to 549° C., determined according to DSC, is likewise a subject of the invention. It can be used extremely well as a flux for soldering aluminum and aluminum alloys, in which case the low melting point is advantageous. In use, it can be applied to the metal parts to be soldered in known manner, for example, by sprinkling the parts with the flux composition.

The flux may also be applied to the metal components to be connected (i.e. soldered) in the form of an aqueous suspension or paste. The solids content of such a suspension or paste is advantageously between 3 and 70% by weight. The remainder to make up to 100% by weight comprises water and/or an organic liquid such as an alcohol. If desired, the flux or the aqueous preparation may contain conventional auxiliaries, for example binders.

The flux may also, in accordance with the teaching of published PCT patent application Ser. No. WO 92/12821

(=U.S. Pat. No. 5,100,048 and U.S. Pat. No. 5,190,596), contain a metal admixed thereto which forms a solderable eutectic with one or both metal surfaces which are to be soldered. One example of such a metal is silicon, which preferably is used in as finely powdered form as possible.

The flux may also comprise metals such as iron, manganese, nickel, zinc and/or others, which modify the surface properties of the soldered parts.

The flux according to the invention is distinguished by its low melting point, and it is therefore especially advantageous for use in soldering aluminum or aluminum alloys.

The following examples are intended to illustrate the invention in further detail, without restricting its scope.

EXAMPLE 1

Preparation of the flux

One (1) mole of aluminum hydroxide was introduced into an aqueous hydrogen fluoride solution which contained 5 moles of HF in a concentration of 50% by weight, and was subsequently reacted at 70° C. with 2 moles of KOH. The resulting crystalline product was filtered out and dried under vacuum at 80° C. The melting point of the product determined according to differential scanning calorimetry (DSC) recording was 548° C.

EXAMPLE 2

Use of the flux for soldering

An aluminum angle-iron and an aluminum plate were dipped into an aqueous solution containing 60% by weight of the flux prepared according to Example 1 and dried. The aluminum angle-iron was laid on the aluminum plate and a solder metal was added. Then the components were heated to 570° C. in a soldering furnace and were soldered together, forming a perfectly satisfactory soldered joint.

The foregoing description and examples have been set forth merely to illustrate the invention and are not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for preparing a potassium fluoroaluminate useful as a flux having a low melting point for soldering aluminum, said method comprising:

reacting $Al(OH)_3$, HF and KOH in aqueous medium in a molar ratio of $Al:F:K=1:5\pm0.2:2\pm0.1$ at a temperature in the range from 60° C. up to the boiling point of the reaction mixture, and recovering precipitated potassium fluoroaluminate having a melting point of 546 to 550° C., as measured by differential scanning calorimetry, wherein said recovering comprises separating precipitated potassium fluoroaluminate from the aqueous medium and drying the separated potassium fluoroaluminate at a temperature below 100° C. under vacuum.

2. A method according to claim 1, wherein said reacting step is carried out at a temperature in the range from 60 to 75° C.

3. A method according to claim 1, wherein $Al(OH_3)$, HF and KOH are reacted in a molar ratio of $Al:F:K=1:5\pm0.1:2\pm0.05$.

4. A method according to claim 1, wherein said reacting step is carried out by introducing $Al(OH)_3$ into aqueous HF solution and thereafter adding KOH.

5. A method according to claim 1, wherein said drying is at 80° C.

* * * * *